(12) United States Patent
Palaikis et al.

(10) Patent No.: US 9,434,845 B2
(45) Date of Patent: Sep. 6, 2016

(54) AQUEOUS DISPERSIONS AND PRECURSORS THEREOF

(71) Applicant: EARTHCLEAN CORPORATION, South St. Paul, MN (US)

(72) Inventors: Liana Victoria Palaikis, Woodbury, MN (US); Nathaniel Paul Guimont, Anoka, MN (US)

(73) Assignee: EarthClean Corporation, South St. Paul, MN (US)

( * ) Notice: Subject to any disclaimer, the term of this patent is extended or adjusted under 35 U.S.C. 154(b) by 0 days.

(21) Appl. No.: 14/357,606

(22) PCT Filed: Dec. 19, 2012

(86) PCT No.: PCT/US2012/070518
§ 371 (c)(1),
(2) Date: May 12, 2014

(87) PCT Pub. No.: WO2013/096393
PCT Pub. Date: Jun. 27, 2013

(65) Prior Publication Data
US 2014/0343198 A1   Nov. 20, 2014

Related U.S. Application Data

(60) Provisional application No. 61/578,422, filed on Dec. 21, 2011, provisional application No. 61/644,015, filed on May 8, 2012.

(51) Int. Cl.
*C09D 5/18* (2006.01)
*A62D 1/00* (2006.01)
(Continued)

(52) U.S. Cl.
CPC .............. *C09D 5/18* (2013.01); *A62D 1/005* (2013.01); *A62D 1/0014* (2013.01); *A62D 1/0064* (2013.01); *C08L 3/02* (2013.01);
(Continued)

(58) Field of Classification Search
CPC ........... C09K 21/14; C09D 5/18; C08L 3/02; A62D 1/005; A62D 1/0064
See application file for complete search history.

(56) References Cited

U.S. PATENT DOCUMENTS

| | | |
|---|---|---|
| 4,820,380 A | 4/1989 | O'Callaghan |
| 7,163,642 B2 * | 1/2007 | Hagquist ............... A62C 2/065 169/44 |

(Continued)

FOREIGN PATENT DOCUMENTS

| | | |
|---|---|---|
| DE | 1 412 907 | 11/1975 |
| WO | WO 2006/042064 | 4/2006 |

(Continued)

OTHER PUBLICATIONS

Moore, S. L., et al., "Types of Antimicrobial Agents," Chapter 2 in Principles and Practice of Disinfection, Preservation & Sterilization, Ed. Fraise, A. P., et al., John Wiley & Sons, 2008, 8-97.*

(Continued)

*Primary Examiner* — Liam J Heincer
*Assistant Examiner* — Nicholas Hill
(74) *Attorney, Agent, or Firm* — Mark DiPietro (57) ABSTRACT

A powder composition includes starch, acrylic acid homopolymer salt, and clay. The powder composition forms an aqueous dispersion having a neutral pH when added to water and is capable of clinging to a surface.

16 Claims, 11 Drawing Sheets

(51) Int. Cl.
*D21H 19/00* (2006.01)
*D21H 19/40* (2006.01)
*D21H 19/54* (2006.01)
*D21H 19/58* (2006.01)
*C09D 191/00* (2006.01)
*C08L 3/02* (2006.01)
*C09K 21/14* (2006.01)

(52) U.S. Cl.
CPC ............ *C09D 191/00* (2013.01); *C09K 21/14* (2013.01); *D21H 19/00* (2013.01); *D21H 19/40* (2013.01); *D21H 19/54* (2013.01); *D21H 19/58* (2013.01); *C08L 2201/02* (2013.01)

(56) References Cited

U.S. PATENT DOCUMENTS 7,476,346 B2 * 1/2009 Hagquist ................ A62C 2/065 169/44

2006/0076531 A1 * 4/2006 Hagquist ................ A62C 2/065 252/4
2011/0073794 A1 * 3/2011 Hagquist ................ A62D 1/00 252/2
2014/0323619 A1 * 10/2014 Palaikis ............... A62D 1/0028 524/52

FOREIGN PATENT DOCUMENTS

| WO | WO 2011/041243 | 4/2011 | | |
|---|---|---|---|---|
| WO | WO 2011/127037 | 10/2011 | | |
| WO | WO 2012009270 A1 * | 1/2012 | ........... | A62D 1/0035 |

OTHER PUBLICATIONS

PCT International Search Report for International Application No. PCT/US2012/070518 filed Feb. 19, 2013 (10 pages).

International Preliminary Report on Patentability for International Application No. PCT/US2012/070518 issued Jul. 3, 2014 (6 pages).

* cited by examiner

AQUEOUS DISPERSIONS AND PRECURSORS THEREOF

This application is a U.S. National Stage Application of International Application No. PCT/US2012/070518, filed Dec. 19, 2012, which was published in English on Jun. 27, 2013 as International Patent Publication WO 2013/096393 A1, which application is hereby incorporated by reference in its entirety, and which claims the benefit under 35 U.S.C. 119(e) of U.S. Provisional Application No. 61/578,422, filed Dec. 21, 2011 and U.S. Provisional Application No. 61/644, 015, filed May 8, 2012.

BACKGROUND

Aqueous dispersions are generally known in industry to be useful for a number of applications. These applications include use as a carrier for active ingredients or for coating substrates. The physical properties of the aqueous dispersion dictate the useful applications of the aqueous dispersion.

Recently aqueous dispersions have been utilized to suppress fire. Aqueous dispersions that are currently utilized to suppress fire can be difficult to formulate and may not exhibit stability. In addition some of these aqueous dispersions or precursors thereof can be corrosive or have a pH that is not neutral. Many of these aqueous dispersions require a pH modification with such strong alkalis such as hydroxides or amines, in order to achieve a thickening effect in aqueous dispersions needed to coat a substrate. In addition, a problem to overcome for chemical retardant formulations and aqueous dispersions in general, is the environmental impact of these formulations. Environmentally friendly and pH neutral formulations are desired.

Aqueous dispersions can also be utilized in other non-fire applications. Such as coating vegetation and other materials for a variety of reasons. Aqueous dispersions are also useful in the treatment and processing of material as an additive or active agent. It is desired to utilize environmentally friendly and pH neutral, non-corrosive formulations that can be added to water and form environmentally friendly and pH neutral, non-corrosive aqueous dispersions.

BRIEF SUMMARY

The present disclosure relates to aqueous dispersions and precursors thereof In particular the present disclosure relates to a powder composition that when added to water forms a dispersion having shear thinning properties. The dispersion can be pH neutral and cling to a surface and be useful for any number of applications.

In a first aspect of the disclosure, a powder composition includes starch, acrylic acid homopolymer salt, and clay. The powder composition forms an aqueous dispersion when added to water and is capable of clinging to a surface.

In a second aspect of the disclosure, a powder composition includes starch, acrylic acid homopolymer salt, clay, propyl paraben and vegetable oil such as cottonseed oil. The powder composition forms an aqueous dispersion when added to water and is capable of clinging to a surface.

In a third aspect of the disclosure, an aqueous dispersion composition includes water, starch, a polyacrylate homopolymer salt, and clay. The aqueous dispersion has a neutral pH, is shear thinning and thixotropic.

In a fourth aspect of the disclosure, a method that includes forming the aqueous dispersion and directing the aqueous dispersion onto a substrate and the aqueous dispersion clings to the substrate. In some embodiments the aqueous dispersion suppresses a fire.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

In the following description, it is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure. Wt % is based on the total weight of the powder composition or aqueous dispersion.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

The term "flocculation" refers to a process of contact and adhesion whereby the particles of a dispersion form larger size clusters. Known mechanisms of flocculation include reduction of electrical charge, and physical bridging. Charge is neutralized by addition of materials giving rise to charged ions opposite in charge to that carried by the particles (e.g. divalent cations in very hard water and anionic polymers). These materials form a physical bridge between two or more particles, uniting the solid particles into a random, three dimensional structure that is loose and porous.

The term "acrylic acid homopolymer salt" is synonymous with 2-propenoic acid homopolymer salt, and polyacrylate salt (e.g., sodium polyacrylate).

The present disclosure relates to aqueous dispersions and precursors thereof. In particular the present disclosure relates to a powder composition (i.e., precursor) that when added to water forms a dispersion having shear thinning properties. The dispersion can be pH neutral and cling to a surface and be useful for any number of applications. In some embodiments, the pH neutral aqueous dispersion can cling to a surface and suppress or extinguish a fire. The aqueous dispersions can have a neutral pH and in many embodiments do not include pH modifiers such as hydroxides or amines, in order to achieve a thickening effect in aqueous dispersions formed from the powder composition. The aqueous dispersion is a dilution of a powder composition and water. The powder composition includes starch, acrylic acid homopolymer salt, and clay. A syngeristic relationship at particular wt % ranges of starch, acrylic acid homopolymer salt, and clay has been discovered. In many embodiments, the powder composition includes minor amounts of vegetable oil such as cottonseed oil and a preservative such as propyl paraben. The aqueous dispersion can be utilized in any coating application where a shear thinning aqueous dispersion having a neutral pH that is non-caustic in either aqueous dispersion or solid powder precursor forms are useful, or desired. The aqueous dispersion can be utilized in any application where flocculation is desired. While the present disclosure is not so limited, an appreciation of various aspects of the disclosure will be gained through a discussion of the examples provided below.

A powder composition includes starch, acrylic acid homopolymer salt, and clay. The powder composition forms an aqueous dispersion when added to water and is capable of clinging to a surface. In many embodiments, the powder composition includes at least 50 wt % starch, 32-38 wt % acrylic acid homopolymer salt, and 4-6 wt % clay. In many embodiments, the powder composition includes at least 50 wt % starch, 32-38 wt % acrylic acid homopolymer salt, 4-6 wt % clay, 0.5-3 wt % vegetable oil preferably being cottonseed oil, and 0.5-7 wt % preservative being propyl paraben. In many embodiments the powder composition has at least 50 wt % starch and acrylic acid homopolymer salt to clay wt % ratio in a range from 9:1 to 5:1. This ratio of polyacrylate homopolymer salt to clay in the powder composition has been found to produce an unexpected and useful viscosity peak in the resulting aqueous dispersion.

In many embodiments the powder composition and the resulting aqueous dispersion does not include a pH modifier. pH modifiers include hydroxides, amines and other pH increasing elements, and are generally strong alkali for greatest thickening efficiency. Many of these materials are corrosive by nature. Numerous carbomers can be found in the industry, a vast majority of which require specific pH control with strong alkalis such as hydroxides or amines, in order to achieve a thickening effect in aqueous dispersions. Carbomer is generally defined as a polymer of acrylic acid cross-linked with a polyfunctional compound, hence, a poly(acrylic acid) or polyacrylate. Dispersion of the carbomers that require neutralization into solution is more complex, requiring a multi-step process. Developing a powder concentrate formulation that is non-corrosive, and is shear thinning in a range of water qualities, was desired. Most neutralized carbomers are by themselves not thixotropic by design. The use of acrylic acid homopolymer sodium salts was also desired to eliminate the need for corrosive agents to impart thickening. Selection and use of natural clays with select acrylic acid homopolymer salts provided the characteristics of both pseudoplasticity and thixotropy at an optimal peak viscosity, and demonstrated a unique synergy of these rheological characteristics.

Any useful starch can be used in the aqueous dispersions and precursors thereof. Examples of starches and their modifications, include corn, wheat, potato, tapioca, barley, arrowroot, rice or any combination of starches. As an aqueous starch-containing dispersion is heated, the starch will begin to swell at approximately 65 to 70 degrees centigrade, turn into an amorphous, jelly-like mass at about 150 degrees centigrade, and then as water is driven off, will decompose at approximately 230 degrees centigrade and higher, giving off steam and $CO_2$ as decomposition products. This behavior contributes to the unique characteristics of the aqueous dispersions in certain applications (e.g., fire suppression). One particularly useful unmodified corn starch is known by the trade name B20F, available from Grain Processing Corporation, Muscatine, Iowa, 52761. The powder compositions contain at least 50% starch or at least 60% starch.

The aqueous dispersion and powder precursor can include acrylic acid homopolymer salt. In many embodiments, the acrylic acid homopolymer salt is a polyacrylate homopolymer salt such as sodium polyacrylate, for example. Sodium polyacrylic acid homopolymers are effective pseudoplastic viscosity control agents or thickening agents, and suspending agents at a neutral pH. In many embodiment, acrylic acid homopolymer salts or sodium polyacrylic acid homopolymers that do not require a pH modifier (e.g., sodium hydroxide, ect.,) to build viscosity are utilized. Two useful acrylic acid homopolymer homopolymer salts are known by the trade names PNC 400™ and Neutragel DA. They are pre-neutralized homopolymer salts, also described as carboxyvinyl polymer sodium salts. PNC 400™ and Neutragel DA are commercially available from 3V Sigma, Inc., Weehawken, N.J. The powder compositions can contain from 30 to 45% acrylic acid homopolymer salt or from 30 to 40% acrylic acid homopolymer salt or from 32 to 38% acrylic acid homopolymer salt or from 34 to 38% acrylic acid homopolymer salt.

The aqueous dispersion and powder precursor can include clay. The clay can be included in any useful amount and can act as a suspending agent and/or thickening agent. Useful natural clays include clays derived from the smectite family. These include Bentonite (montmorillonite), Hectorite, Magnesium Aluminum Silicate, Saponite, Sepiolite, Beidellite, Nontronite and Sauconite. The most common of these natural smectite clays exhibit an octahedral structure. Hectorite appears as a trioctahedral smectite, while montmorillonite can be referred to as a dioctahedral smectite. This refers to the structure of the metal elements in the crystal lattice. When smectite clay platelets are fully dispersed in water of low to moderate electrolyte content, they readily form an open, three-dimensional colloidal dispersion of individual clay platelets. The individual platelets are highly charged (positively on the edges and negatively on the faces) and stretch their bond lengths when the inter-layer cations hydrate. This colloidal structure is also commonly referred to as a 'house of cards' network that can thicken water and encourage thixotropic behavior due to hysteresis observed and measured during recovery after applying shear. These clay colloidal structures also impart the following characteristics to aqueous systems: thickening, suspension, sag control, and stability. Hectorite clays provide higher viscosity, sag control, and lower iron content as compared to bentonite clays. This is of particular importance when working with higher electrolyte-containing aqueous systems. Iron can reduce the viscosity build of synthetic polymeric thickening agents.

Another phenomenon observed with the addition of clay is the increased uniformity of the aqueous dispersion at higher clay concentrations. At lower levels of clay, the polyacrylate homopolymer does not disperse as easily upon agitation and creates tapioca-like agglomerates that break upon stress, and are believed to be created due to the polymer not completely dispersing or wetting out. Upon addition of clay there are less observed agglomerates mixed under similar time and conditions. This is thought to allow the aqueous dispersion to build in viscosity faster by having the clay acting as a dispersing agent, breaking up the polyacrylate masses leading to more efficient and complete hydration of the polymer, and ultimately shortening the time required to reach equilibrated viscosity.

Commercially available hectorite clays are available under the trade designations Bentone™ MA, and Bentone™ EW NA, available from Elementis Specialities Inc., (Hightstown, N.J.) for example. Commercially available sodium bentonite clays are available under the trade designations Volclay™ FD-181, available from American Celloid Company, (Hoffman Estates, Ill.) for example. Bentone™ MA and Bentone™ EW NA are natural hectorite clays that have been found to be unusually effective for building viscosity in the aqueous dispersion in addition to imparting thixotropy. The powder compositions can contain from 1 to 10% clay or from 4 to 6% clay or from 5 to10% clay or from 3 to 6% clay.

In many embodiments, when diluted or dispersed into water or injected into a stream of water, the powder composition can make up from 0.1 to 5 wt % or from 0.1 to 2 wt % or from 0.5 to 1.5 wt % of the aqueous dispersion. The aqueous dispersion can have a neutral pH or a pH from 6.5 to 7.5 or from 7.0 to 7.3 for example. This neutral pH range is exhibited without utilizing a pH modifier such as strong alkalis such as hydroxides or amines, in order to achieve a thickening effect in aqueous dispersions needed to coat a substrate. The powder composition and the aqueous dispersion can be substantially free of a pH modifier such as an alkali or amine In many embodiments, the aqueous dispersion has 0.6-0.8 wt % solids concentration in RO water and a viscosity greater than 8000 cP with a Brookfield viscometer #5 spindle at 30 rpm and a viscosity greater than 36000 cP with a #5 spindle at 5 rpm. In many embodiments, the aqueous dispersion has 0.6-0.8 wt % solids concentration in water (having a hardness greater than 100 mg/l $CaCO_3$) and a viscosity range of about 5000-15000 cP with a Brookfield viscometer #5 spindle at 5 rpm.

The aqueous dispersion, described above, can be formed without a pH modifier such as strong alkalis such as hydroxides or amines, for example, in either the powder composition or supplementally added to the composition when diluting with water. Excluding a pH modifier like sodium hydroxide, for example, in the powder composition and aqueous dispersion reduces the corrosivity of the powder composition and aqueous dispersion.

Figure 5:
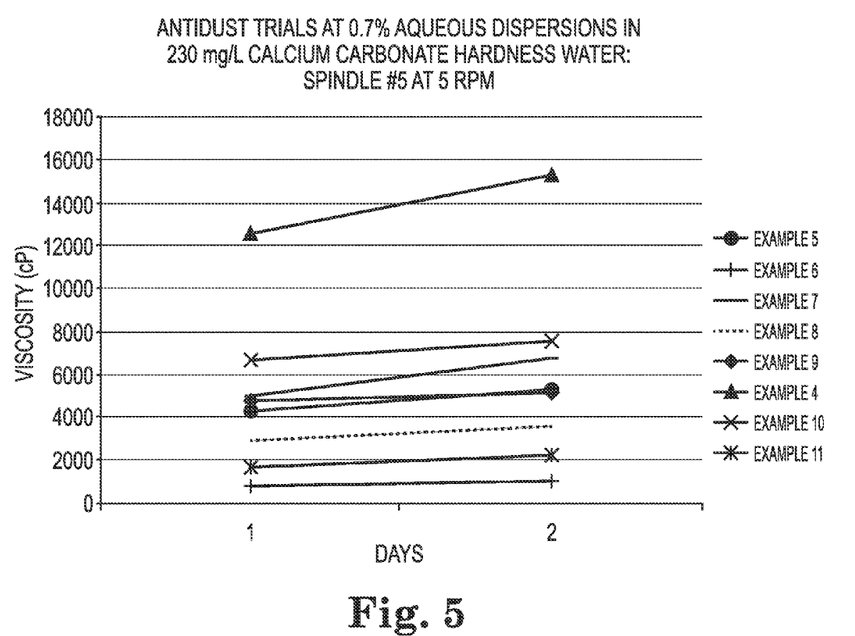
FIG. 5 is a graph of Examples 5-11 viscosities at 5 rpm.

In many embodiments a vegetable oil is included as an anti-dusting or de-dusting agent in the powder composition. It was found that the addition of vegetable oil reduces the viscosity of resulting aqueous dispersions formed by diluting the powder composition with water. It has also been found that certain vegetable oils affect viscosity to different degrees, as illustrated in the Examples. For example, cottonseed oil provided the least viscosity depression at 1.5 wt %. At least 1.5 wt % of oil was needed to provide adequate anti-dusting of the powder composition. FIG. 5 illustrates the effect of a variety of oils on the viscosity a 0.7% wt aqueous dispersions. Cottonseed oil surprisingly maintains the best viscosity level of any of the tested vegetable oils (e.g., soybean, glycerin, soy methyl ester) and paraffins or olefins (e.g., BioBase 200 material or mineral oil).

The longevity of the aqueous dispersions in reverse osmosis (i.e., RO) water is rather long. However, in applied situations given the agricultural based components of the formulation, and with varying water qualities, the need for a preservative for extended storage of the aqueous dispersions comes into play. In many cases, unpreserved aqueous dispersions themselves are reasonably stable, with no odor or observed discoloration for approximately 30 days. For extended storage of 3-6 months, food or cosmetic grade preservatives were evaluated as more ecofriendly alternatives to biocides, as preservatives. The preservatives evaluated here were citric acid, sorbic acid, potassium sorbate, mycoban calcium propionate, methyl paraben and propyl paraben. All of the preservatives were received from Chem/Serv, Inc., Minneapolis, Minn.

These preservatives were blended into the powder concentrate formulas at levels such that when the powders were diluted into working aqueous dispersions, preservative levels were maintained at typical efficacy levels of between 0.05-0.10%. The aqueous dispersions prepared with potassium sorbate, sorbic acid, citric acid, or calcium propionate either had very low viscosities when compared to an unpreserved control, or did not form a thickened dispersion (below the measurable limit of the viscometer). Thus these preservatives were not viable options for the aqueous dispersions described herein with vertical cling ability.

Figure 4:
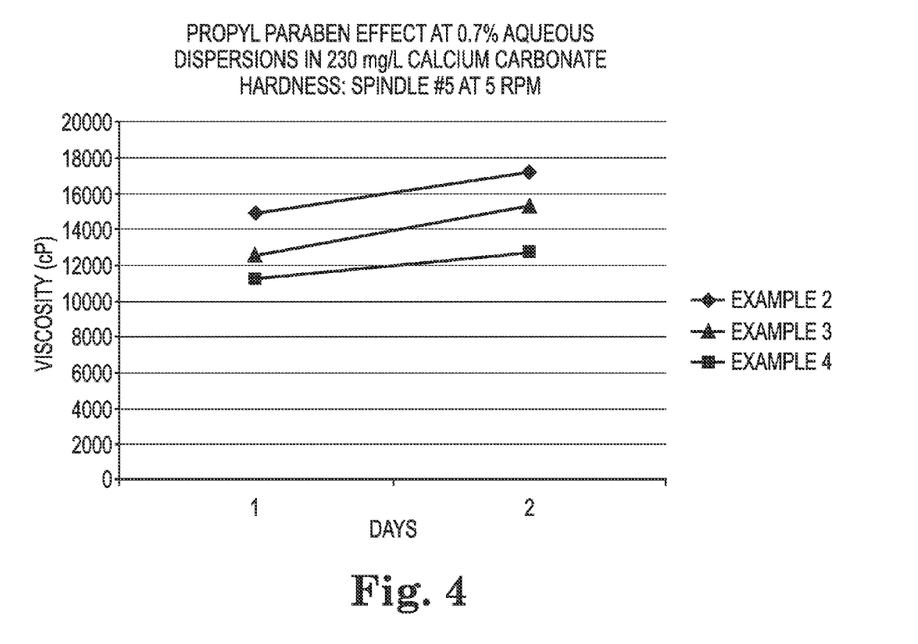
FIG. 4 is as graph of Examples 2-4 viscosities at 5 rpm.

Only the parabens produced dispersion viscosities that were either comparable or higher than that of the unpreserved control aqueous dispersion. Surprisingly, the two evaluated parabens consistently demonstrated the ability to significantly increase the viscosity of the aqueous dispersions with the addition of the preservative. Propyl Paraben is globally accepted from a toxicity standpoint. Propyl Paraben is further commercially available under the same trade name from Acme Hardesty Oleochemicals, Blue Bell, Pa. As the amount of propyl paraben is increased from 0% to 5% wt in the powder composition, the viscosity (of a 0.7% wt aqueous dispersion) surprisingly increases as illustrated in FIG. 4.

In many embodiments a preservative is included in the powder composition. Propyl paraben is utilized in the Examples. It was found that propyl paraben can extend the "shelf life" of the aqueous dispersion up to at least 5 months at between 3 to 5 wt % propyl paraben concentration in the powder concentrate. It has also been found that this level of propyl paraben surprising boosts viscosity levels and improves fire "knockdown" ability of the aqueous dispersion by improving the vertical cling-ability of the aqueous dispersions.

Aqueous dispersions produced in the Examples discussed herein exhibit "shear thinning" or "pseudoplastic" and "thixotropic" character, which means the aqueous dispersion becomes thin when sheared or pumped (pseudoplastic), and sag resistant (thixotropic), at rest, allowing it to cling to substrates at varying angles. The aqueous dispersion does not separate or settle, maintaining a stable viscosity profile over an extended period of time. Selection and use of natural clays with select acrylic acid homopolymers achieves the complimentary characteristics of both pseudoplasticity and thixotropy at an optimal peak viscosity, demonstrating a unique synergy between the selected materials, as illustrated in the Examples below.

In one or more embodiments, aqueous dispersions of the exhibit the ability to produce a floc. Upon over hydration of the aqueous dispersion, a floc can be formed. This floc has a surprising high floc strength. It is believed that this flocculating ability can be useful for a number of applications that utilize flocculation. These applications can include water treatment and oil drilling, for example. For flocculation applications, the powder composition can make up from 0.001 to 3 wt % or from 0.001 to 0.5 wt % or from 0.001 to 0.1 wt % of the aqueous dispersion. The aqueous dispersion can have a neutral pH or a pH from 6.5 to 7.5 or from 7.0 to 7.3 for example. This neutral pH range is exhibited without utilizing a pH modifier such as strong alkalis such as hydroxides or amines, in order to achieve a thickening effect in aqueous dispersions needed to coat a substrate. The powder composition and the aqueous dispersion can be substantially free of a pH modifier such as an alkali or amine It is observed that when the powder compositions described herein are combined with purified water (e.g., distilled or reverse osmosis water), a flocculent is not formed. While not wishing to be bound by any particular theory, it is proposed that the use of starch in the dispersion or gel matrix results in enhanced flocculating capacity (very high volume of floc produced at very low levels of polymer/starch dispersion upon dilution of the dispersion in hard water to less than 0.5 wt %). The starch-loading of gels may provide for a lower cost, higher efficiency flocculating agent for aqueous systems, when contrasted with current synthetic polymer-only, clay-only or polymer-clay flocculating agent compositions.

Some of the advantages of the disclosed aqueous dispersions are further illustrated by the following examples. The particular materials, amounts and dimensions recited in this example, as well as other conditions and details, should not be construed to unduly limit the present disclosure.

EXAMPLES

The homogeneous powder blend concentrates used to prepare the aqueous dispersions of the Examples were produced by: blending the powder ingredients in an approximately 1.8 kg (4 lb) capacity V-Blender or smaller 30 gram capacity lab tumbler for approximately 10 minutes. The powder blend concentrates and the aqueous dispersions of the Examples do not included pH modifiers such as strong alkalis such as hydroxides or amines.

The materials utilized in these Examples are described below.

PNC 400™ is a acrylic acid homopolymer sodium salt (3V Sigma, Inc., Weehawken N.J.)

Neutragel DA™ is a acrylic acid homopolymer sodium salt (3V Sigma, Inc., Weehawken N.J.)

CARBOPOL™ EZ-3 is a hydrophobically modified cross-linked polyacrylate copolymer. (Lubrizol, Inc., Cleveland, Ohio)

CARBOPOL™ EZ-2 is a hydrophobically modified cross-linked polyacrylate copolymer (Lubrizol, Inc., Cleveland, Ohio)

Tego Carbomer 140G is a polyvinyl carboxy polymer cross-linked with ethers of pentaerythritol (Evonik Industries, AG, Essen, Germany).

PNC 600 is an anionic acrylate polymer (Coast Southwest, Placentia, Calif.)

CARBOPOL™ 694 is a crosslinked acrylic polymer (Noveon, Inc., Cleveland, Ohio)

Bentone™ MA is an natural hectorite clay (Elementis Specialities Inc., Highstown N.J.)

Bentone™ EW NA is a natural hectorite clay (Elementis Specialities Inc., Highstown, N.J.)

Bentone™ LT is a cellulose modified hectorite clay (Elementis Specialities Inc., Highstown, N.J.)

Volclay™ FD-181 is a natural sodium bentonite clay (American Celloid Company, Hoffman Estates Ill.)

B20F is an unmodified corn starch (Grain Processing Corporation, Muscatine, Iowa)

Glycerine, such as Glycerine Vegetable, USP #956 from Columbus Vegetable Oils, Des Plaines, Ill.

Mineral oil, such as Mineral Oil #900, from Columbus Vegetable Oils, Des Plaines, Ill.

Soy Methyl Ester, such as Soy Methyl Ester #970 from Columbus Vegetable Oils, Des Plaines, Ill.

Soybean Oil, such as Soybean Oil 100 from Columbus Vegetable Oils, Des Plaines, Ill. or Roundy's Vegetable Oil, Roundy's Supermarkets, Inc, of Milwaukee, Wis.

Cottonseed Oil, such as Cottonseed 310 from Columbus Vegetable Oils, Des Plaines, Illinois, 60018 or Cottonseed Oil from SoapGoods, Atlanta, Ga.

Synthetic Linear Alpha Olefin such as Biobase 200, from Shrieve Chemical, Spring Tex.

Powder Examples A'-Q' were formulated according to Table 1 below.

TABLE 1

| Example | Polymer (wt %) | Clay (wt %) | Starch (Cargill Unmodified (wt %)) |
|---|---|---|---|
| A' | 34 (PNC 400) | 0 | 66 |
| B' | 34 (PNC 400) | 2.5 (Bentone EW NA) | 63.5 |
| C' | 34 (PNC 400) | 5 (Bentone EW NA) | 61 |
| D' | 34 (PNC 400) | 10 (Bentone EW NA) | 56 |
| E' | 34 (PNC 400) | 15 (Bentone EW NA) | 51 |
| F' | 34 (PNC 400) | 4 (Bentone EW NA) | 62 |
| G' | 34 (PNC 400) | 4.5 (Bentone EW NA) | 61.5 |
| H' | 34 (PNC 400) | 5.5 (Bentone EW NA) | 60.5 |
| I' | 34 (PNC 400) | 6 (Bentone EW NA) | 60 |
| J' | 34 (PNC 400) | 5 (Bentone MA) | 61 |
| K' | 34 (PNC 400) | 5 (Volclay FD 181) | 61 |
| L' | 34 (PNC 400) | 5 (Bentone LT) | 61 |
| M' | 34 (Carbopol EZ 3) | 5 (Bentone EW NA) | 61 |
| N' | 34 (Carbopol EZ 2) | 5 (Bentone EW NA) | 61 |
| O' | 34 (Tego Carbomer 140 G) | 5 (Bentone EW NA) | 61 |
| P' | 34 (PNC 600) | 5 (Bentone EW NA) | 61 |
| Q' | 34 (Carbopol 694) | 5 (Bentone EW NA) | 61 |

Each powder Example A'-Q' were diluted with reverse osmosis water (e.g., RO) to a 0.6 wt % aqueous dispersion (Examples A-Q) and assessed for its ability to form a viscous dispersion at the 0.6 wt % mix ratio of the above powder formulations in reverse osmosis water. 3.0 grams of powder concentrate material was measured into 497.0 g of water in a 1000 ml beaker. The samples were mixed using a Kitchen Aid immersion blender with a variable speed dial set to the lowest speed (1). The blender was immersed in the liquid and run until a visually homogeneous and smooth dispersion was produced. The dispersions were covered and left to sit at room temperature to develop "equilibrium viscosity", defined as the measured viscosity after 24 hours.

The pH of the equilibrated aqueous dispersions were measured using an IQ Scientific Instruments Model IQ240 pH meter equipped with a stainless steel probe. The pH meter was calibrated using a two-point calibration procedure, per manufacturer instructions, in pH 4 and pH 7 standard buffer solutions. The pH electrode was immersed in the dispersion, and once a stable pH reading was observed, the value was recorded. The values are noted in Table 2.

Viscosities of the aqueous dispersions were measured using a Brookfield Viscometer, Model RVDVE. All dispersions were stirred by hand with a tongue depressor for approximately 10 rotations. All equilibrated dispersions were measured at room temperature, with the viscometer set to either a speed of 30 rpm, or 5 rpm (as noted), using a Spindle #5. Once a stable reading was displayed, the equilibrium viscosity was noted after an additional 60 seconds, and recorded in centipoise (cP). Each viscosity reading represents an average of three dispersion sample repetitions. The readings were recorded at both 30 rpm and 5 rpm, and the average viscosities for each experimental condition are noted in Table 2.

Burn-Through Test—Each aqueous dispersion made from the Examples was subjected to a burn test to determine a time value of when the sample aqueous dispersion loses structural integrity and no longer protects the surface from fire. A 1"×6" pine wood coupon that is uniformly coated using a Myer bar or similar apparatus with ¼ inch of sample aqueous dispersion at a particular concentration, and placed 17 cm from the tip of a propane fueled flame apparatus measuring 1800 degrees F. at the point of impingement of the coated surface. The amount of time required to burn through the test material coating and burn a 1" diameter scorch mark on the coupon is recorded. This test is repeated four times.

Aqueous Dispersion (in RO water) Examples A-Q were tested and the results are illustrated in Table 2 below. In Table 2, pH values that were not noted are assumed to be neutral and in a range from 7.08 to 7.26.

TABLE 2

| Example | Average Viscosity @ 30 rpm #5 Spindle | Average Viscosity @ 5 rpm #5 Spindle | pH |
| --- | --- | --- | --- |
| A | 6800 | 29000 | 7.1 |
| B | 7700 | 33000 | — |
| C | 8900 | 40000 | 7.26 |
| D | 7500 | 33000 | 7.2 |
| E | 7300 | 33000 | 7.08 |
| F | 8700 | 39000 | — |
| G | 8700 | 38000 | — |
| H | 8400 | 37000 | — |
| I | 7700 | 34000 | — |
| J | 9300 | 40000 | — |
| K | 8300 | 36000 | — |
| L | 6600 | 28000 | — |
| M | ND | ND | 4.4 |
| N | ND | ND | 3.5 |
| O | ND | ND | 3.5 |
| P | ND | ND | 5.7 |
| Q | ND | ND | 3.4 |

ND - not detectable

Figure 1A:
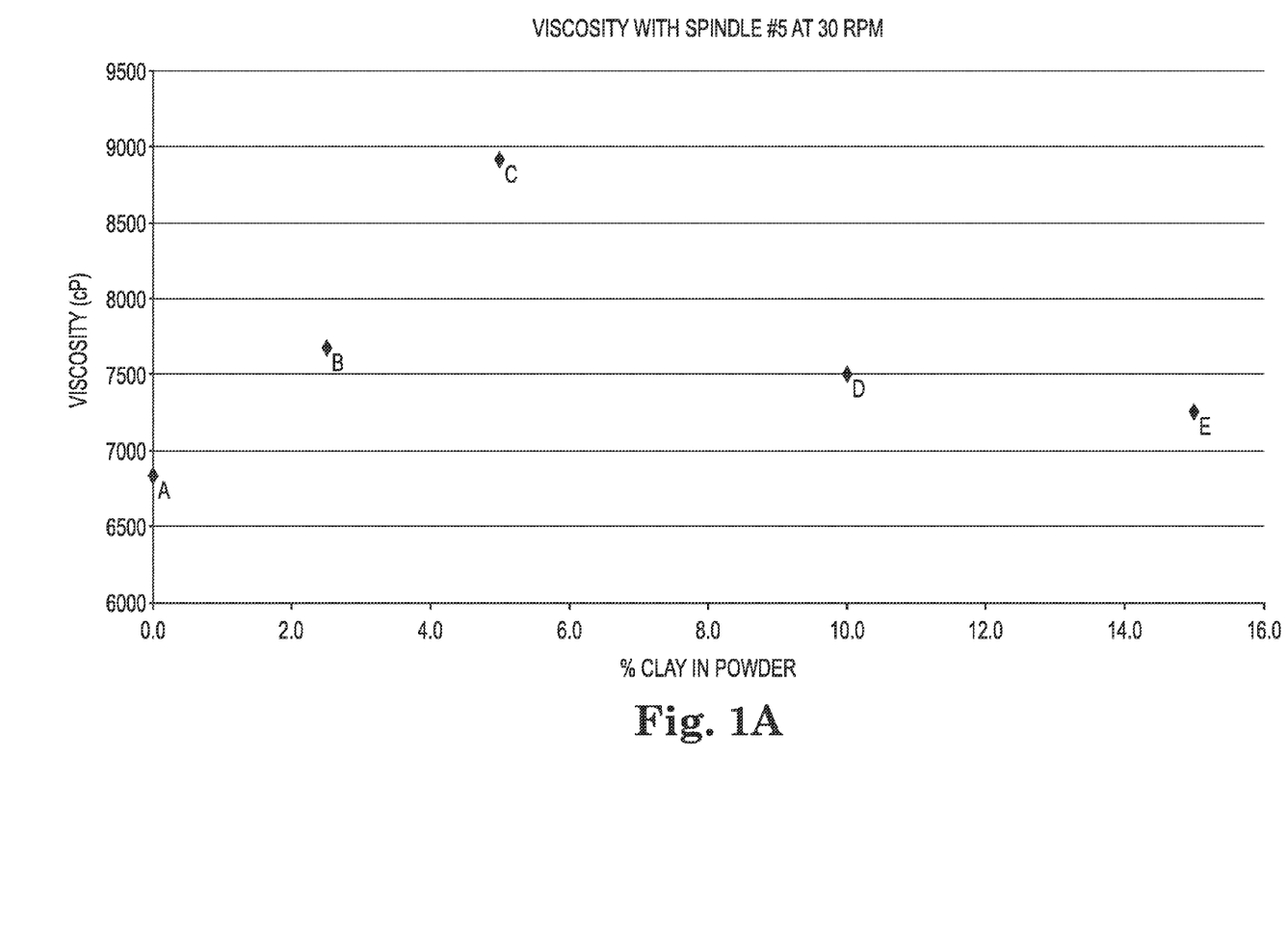
FIG. 1A is a graph of Examples A to E viscosities at 30 rpm.
Figure 1B:
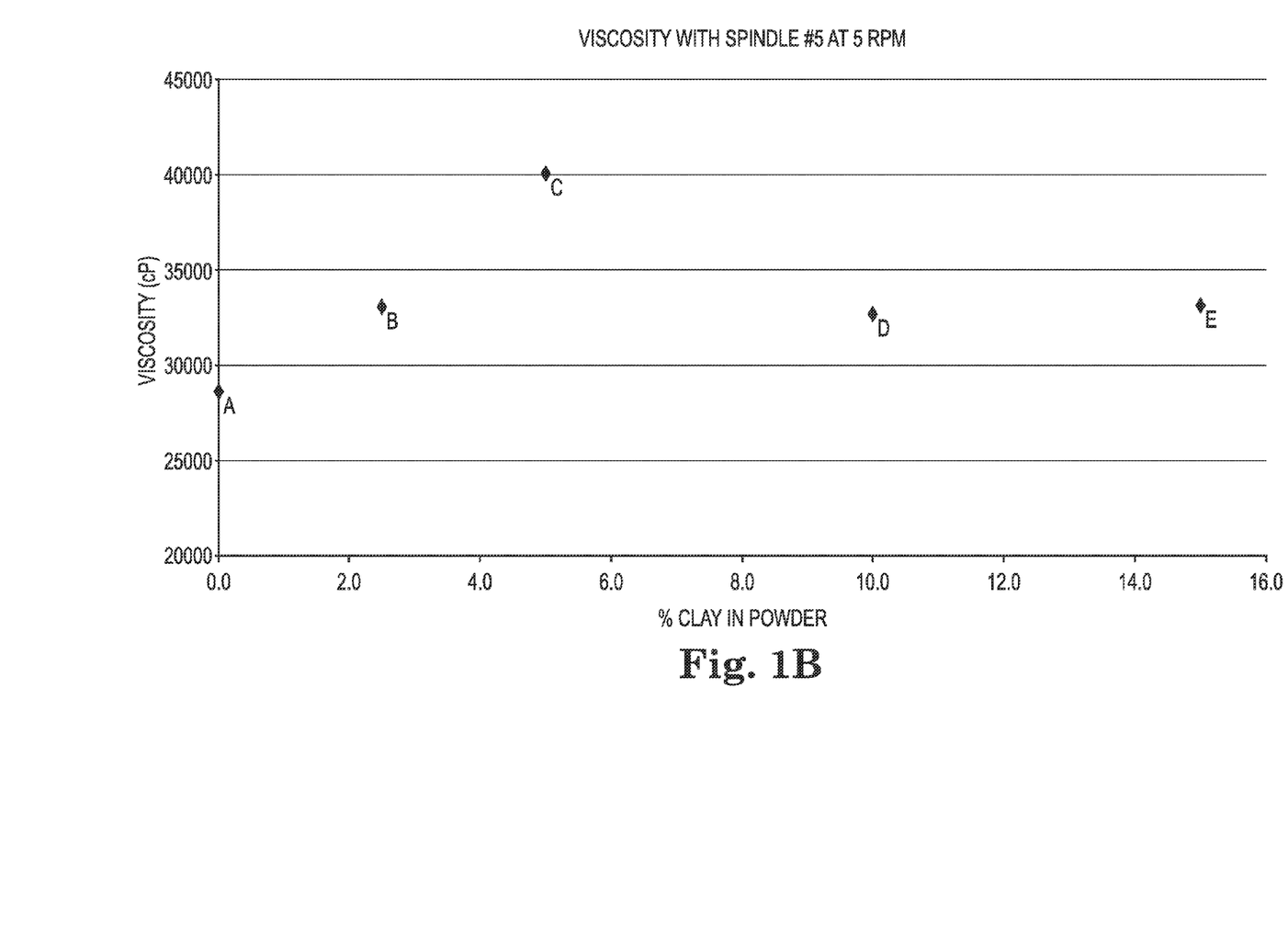
FIG. 1B is a graph of Examples A to E viscosities at 5 rpm.

FIGS. 1A and 1B describe the impact of the variation in polymer to clay ratio on equilibrium viscosity. Aqueous dispersion Examples A-E, show an unexpected peak in viscosity at a hectorite clay concentration of 5 wt %, or an acrylic acid homopolymer sodium salt to clay ratio of 6.8 (Example C). This peak indicates an unexpected synergy between the acrylic acid homopolymer sodium salt and clay, leading to a desired viscosity profile. FIG. 1A viscosities were measured at a higher spindle speed, while FIG. 1B viscosities were measured at a slower speed, demonstrating the shear thinning behavior of these aqueous dispersion Examples.

Figure 2A:
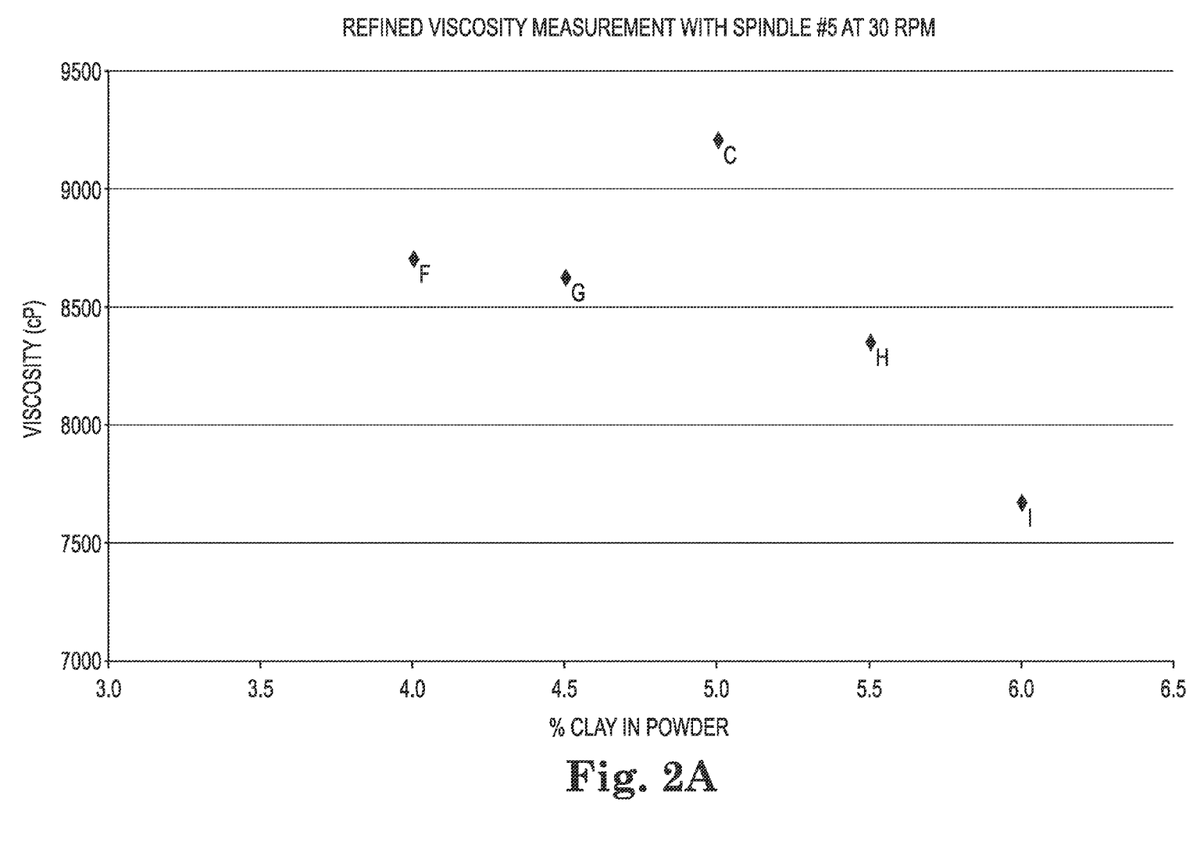
FIG. 2A is a graph of Examples F to I viscosities at 30 rpm.
Figure 2B:
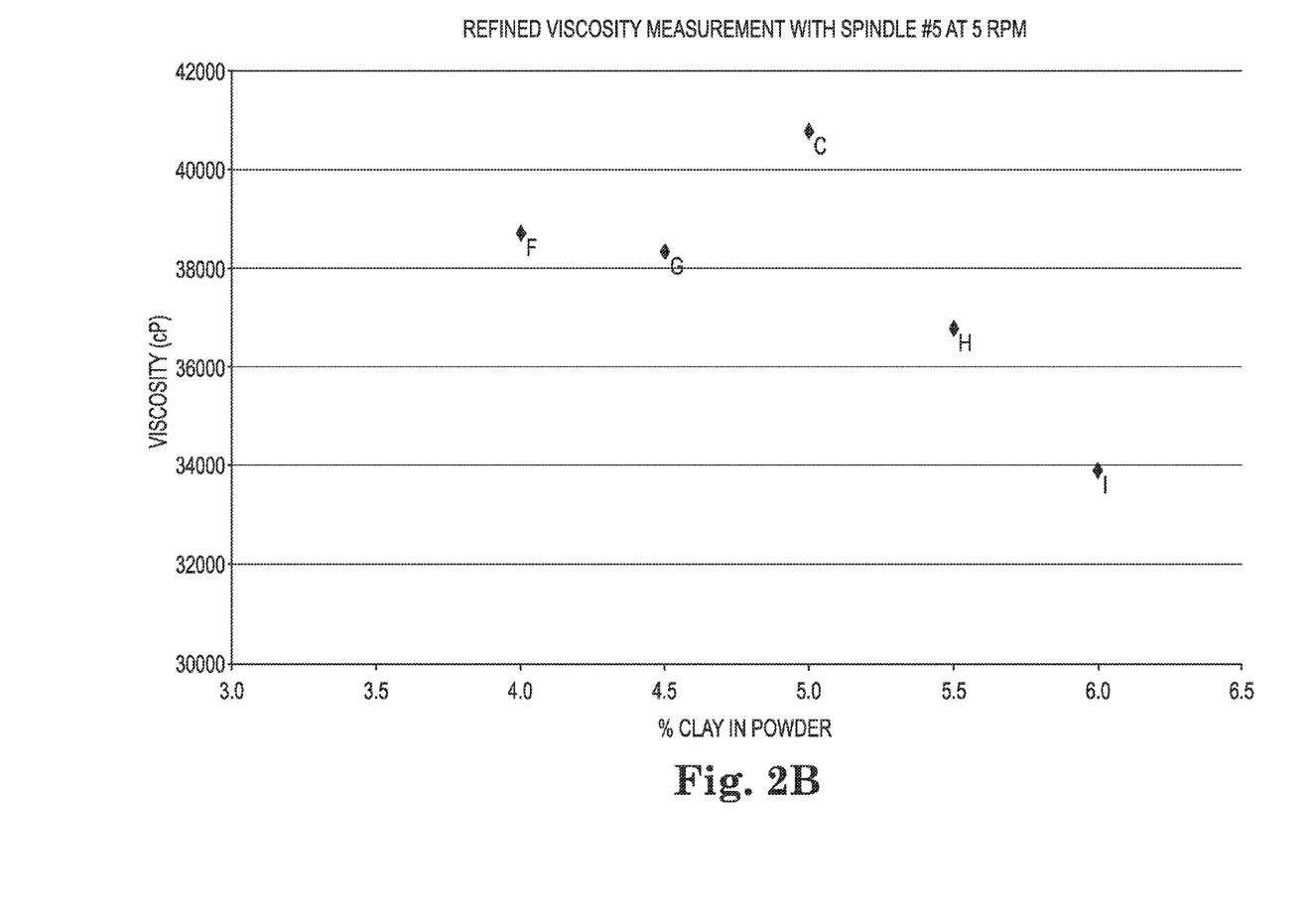
FIG. 2B is a graph of Examples F to I viscosities at 5 rpm.

This synergy was further examined by further narrowing the clay concentration range and repeating the equilibrium viscosity measurements. FIGS. 2A and 2B demonstrate the sensitivity of the system with respect to carbomer to clay ratio. Example C, at the "optimal ratio" of 6.8, and Examples F-I, on either side of this ratio. FIG. 2A viscosities were again measured at a higher spindle speed, while FIG. 2B viscosities were measured at a slower speed, demonstrating the shear thinning behavior of these aqueous dispersion Examples.

Example C also exhibits good cling properties when exposed at an approximate 0.3" inch thick coating, 1 inch wide, and 6 inches long, on 6 inch×6 inch plate glass at room temperature. While shear banding is observed when the plate is placed vertically and the dispersion is allowed to droop along the length of the gel, the remaining approximate 2 mm thick uniform sub-layer exhibits good cohesive strength and maintains an overall cling time of greater than 2 minutes prior to completely sliding off the surface. Example C was tested on a fire where a specified thermal layer temperature was continuously measured. A specified and generally equal amount of water and Example C was directed onto a substrate in the thermal layer zone. Example C suppressed the fire and provided a reduction in the thermal layer temperature of more than 2× the % temperature reduction of water.

Figure 3A:
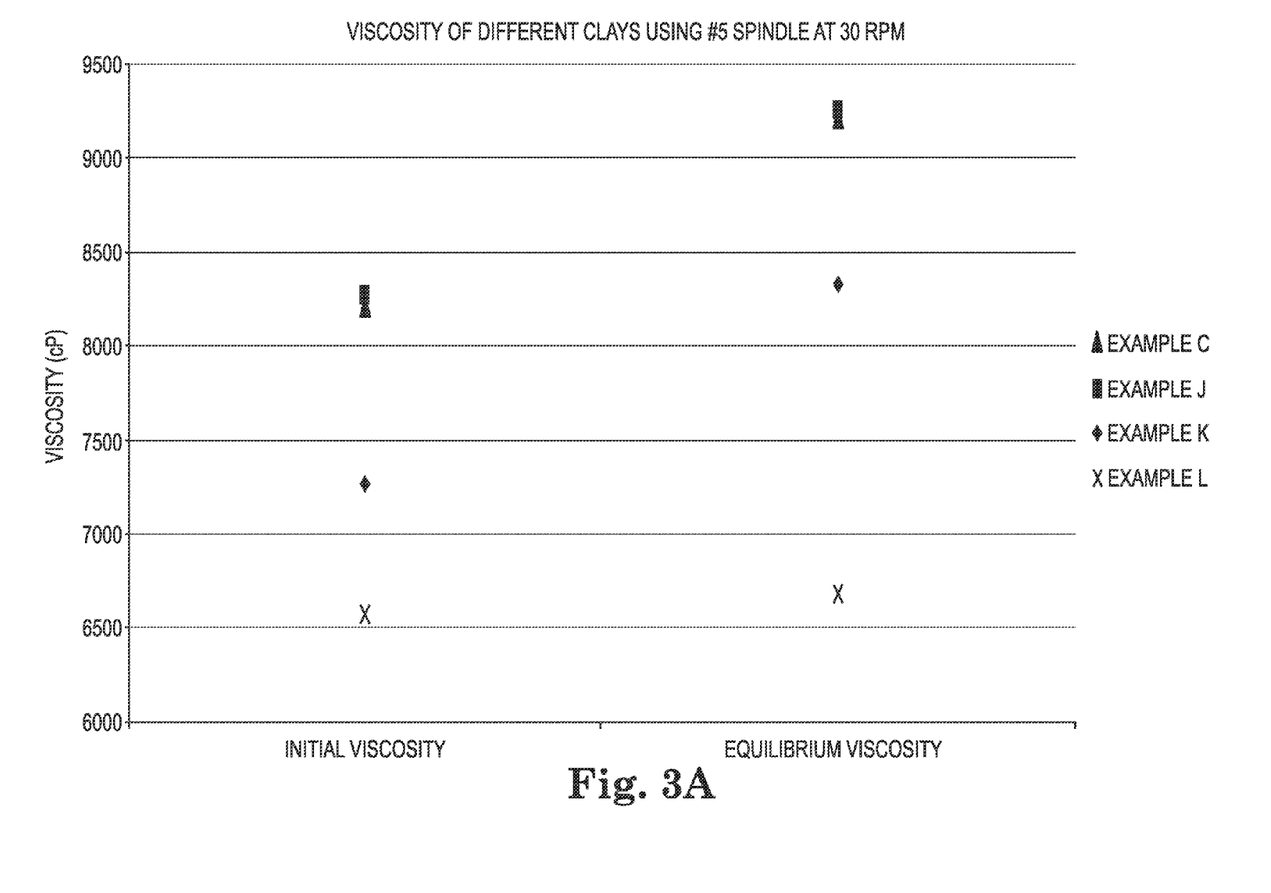
FIG. 3A is a graph of Examples C, J, K and L viscosities at 30 rpm.
Figure 3B:
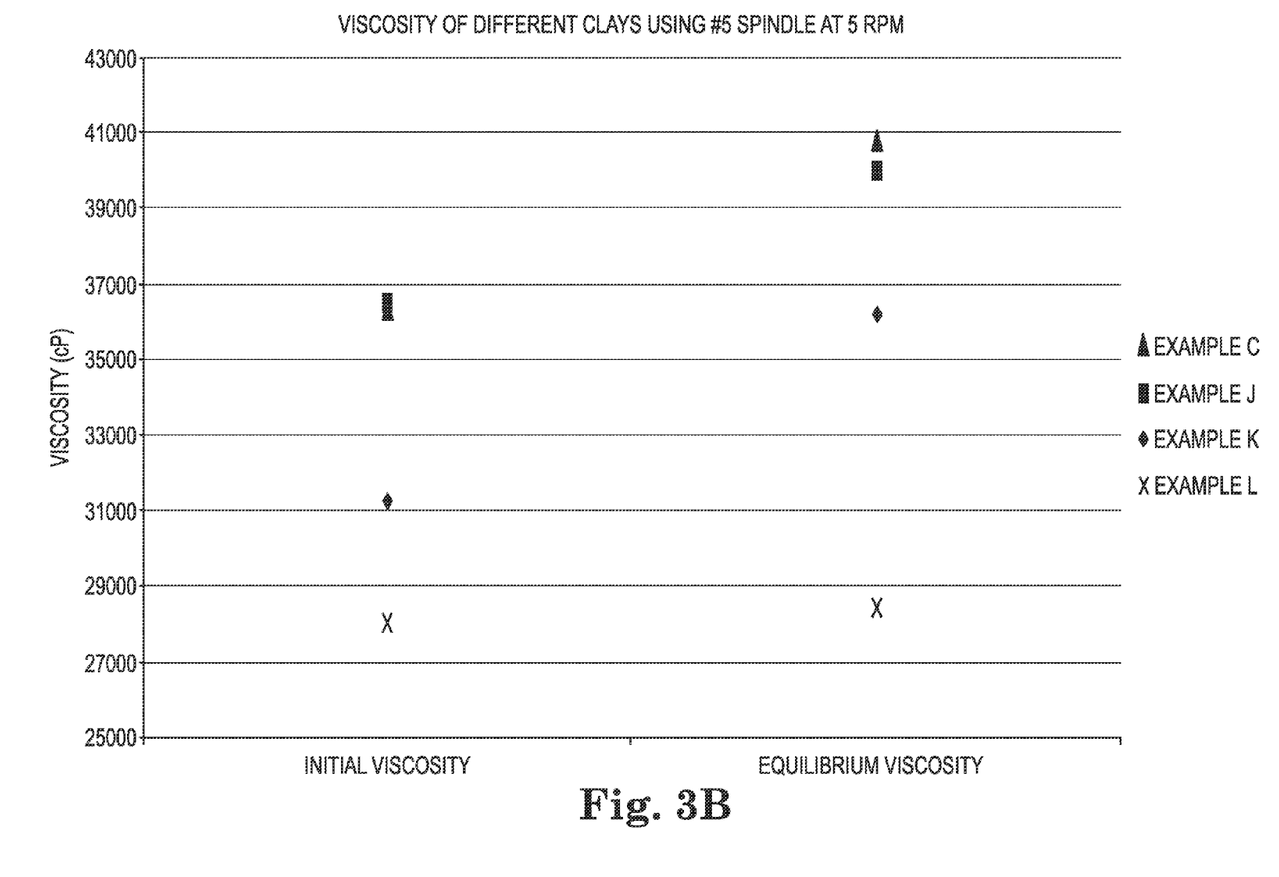
FIG. 3B is a graph of Examples C, J, K and L viscosities at 5 rpm.

Finally, FIGS. 3A and 3B describe the impact on viscosity of natural hectorite, hectorite-cellulosic modified and bentonite clays at an acrylic acid homopolymer sodium salt to clay ratio of 6.8. Examples C, J, K and L are graphed demonstrating both the initial dispersion viscosity (minutes after mixing), and equilibrium viscosity (at 24 hours). The Figure demonstrates the enhanced performance of simple natural hectorite clays over the variations as described above.

Table 1 also summarizes a range of other representative carbomer materials that were substituted for the PNC-400 polymer in the formulation, and are described as Examples. Examples M, N, O, P and Q did not produce viscous dispersions. Example A, with PNC-400 (or Neutragel DA) only, and no clay, produced a viscous dispersion with low adhesive strength. Since pH modifiers were not utilized in these formulations, Examples M, N, O, P and Q did not achieve any thickening. These carbomers (Examples M, N, O, P and Q) require strong alkalis such as hydroxides or amines, to achieve a thickening effect in aqueous dispersions.

The following further Examples in Table 3 illustrate the effect of propyl paraben and choice of vegetable oil for anti-dusting such as cottonseed oil on the physical properties of aqueous dispersions.

TABLE 3

| Example | Polymer (wt %) | Clay (Bentone EW NA (wt %)) | Preservative (Propyl Paraben (wt %)) | Anti-Dust (wt %) | Starch (Unmodified Starch GPC B20F (wt %)) |
|---|---|---|---|---|---|
| 1 | 36 (Neutragel DA) | 5 | 5 | 1.5 (Cottonseed Oil - 310) | 52.5 |
| 2 | 38 (Neutragel DA) | 5 | 5 | 0 | 52 |
| 3 | 38 (Neutragel DA) | 5 | 3 | 0 | 54 |
| 4 | 38 (Neutragel DA) | 5 | 0 | 0 | 57 |
| 5 | 38 (Neutragel DA) | 5 | 3 | 1 (Glycerine, Vegetable USP #956) | 53 |
| 6 | 38 (Neutragel DA) | 5 | 3 | 1 (Soy Methyl Ester #970) | 53 |
| 7 | 38 (Neutragel DA) | 5 | 3 | 1 (Mineral Oil #900) | 53 |
| 8 | 38 (Neutragel DA) | 5 | 3 | 1 (Soybean Oil #310) | 53 |
| 9 | 38 (Neutragel DA) | 5 | 3 | 0.5 (Roundy's Soybean Oil) | 53.5 |
| 10 | 38 (Neutragel DA) | 5 | 3 | 1.5 (Cottonseed Oil 310) | 52.5 |
| 11 | 38 (Neutragel DA) | 5 | 3 | 1 (Bio Base 200) + 0.5 (Roundy's Soybean Oil) | 52.5 |

Figure 6:
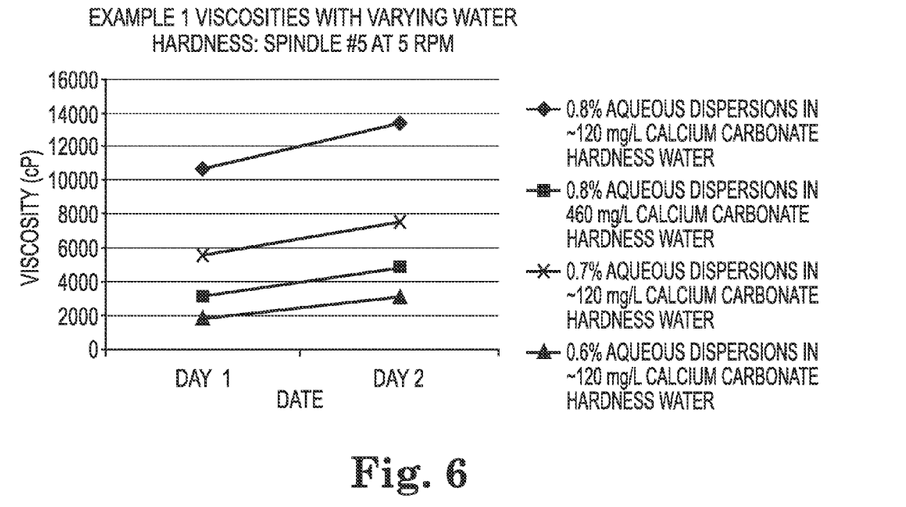
FIG. 6 is a graph of Example 1 viscosities at 5 rpm in various water hardness.

Example 1 was tested utilizing a number of different water hardness levels and a number of different solids wt % in aqueous dispersions as illustrated in FIG. 6. Generally as the water hardness increases, the viscosity level decreases and as the wt % increases the viscosity increases.

Figure 7:
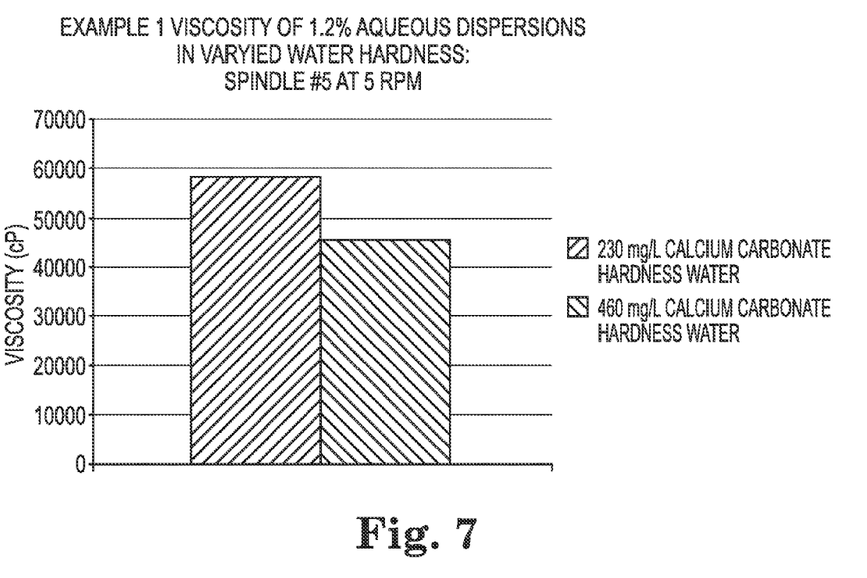
FIG. 7 is a graph of Example 1 viscosities at 5 rpm in various water hardness.

Example 1 was tested at a 1.2% wt aqueous dispersion at 230 mg/l calcium carbonate hardness and at 460 mg/l calcium carbonate hardness as illustrated in FIG. 7. Again, as described above, the viscosity level generally decreases and the water hardness used to form the aqueous dispersion increases.

Figure 8:
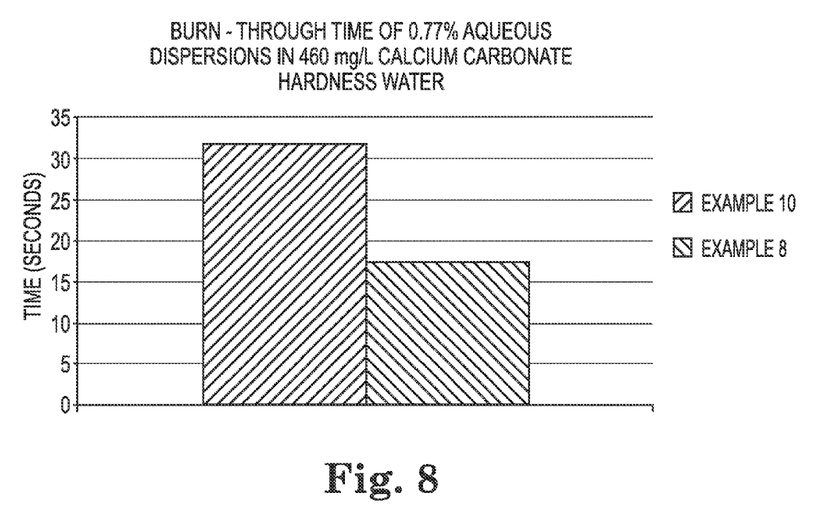
FIG. 8 is a graph of Examples 8 and 10 burn-through time.

FIG. 8 illustrates the burn through times of 0.7% wt aqueous dispersions of Example 8 (soybean oil) and Example 10 (cottonseed oil) in very hard water. Surprisingly, Example 10 (cottonseed oil) provided a higher burn through time by nearly a factor of 2× in this more challenging water quality.

Thus, embodiments of the AQUEOUS DISPERSIONS AND PRECURSORS THEREOF are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. An aqueous dispersion comprising water and a powder composition, the powder composition consisting essentially of:
   (i) greater than about 50 weight percent starch;
   (ii) about 32-38 weight percent of an acrylic acid homopolymer, or an acrylic acid homopolymer salt; and
   (iii) about 0.5 to 7 weight percent of preservative;
   (iv) greater than about 1.5 weight percent of a compound comprising a combination of a vegetable oil and either a liquid olefin or a liquid paraffin; and
   wherein the powder composition is compatible with water to form an aqueous dispersion and the dispersion, when applied to a surface, is capable of clinging to the surface, the dispersion having a substantially neutral pH of about 6.5 to 7.5 and is thixotropic.

2. The dispersion of claim 1 wherein the preservative is selected from the group consisting of citric acid, sorbic acid, potassium sorbate, mycobin, calcium propionate, methyl paraben and propyl paraben.

3. The dispersion of claim 1 wherein the compound comprises a combination of a vegetable oil and a liquid olefin.

4. The dispersion of claim 1 wherein the compound further comprises about 0.5-3 weight percent of a vegetable oil.

5. The dispersion of claim 1 wherein the vegetable oil comprises a cottonseed oil or a soybean oil or mixtures thereof.

6. The dispersion of claim 1 wherein the powder composition is substantially free of clay.

7. The dispersion of claim 1 wherein the olefin comprises a synthetic liquid alpha olefin.

8. The dispersion of claim 1 comprising a viscosity of about 5,000-15,000 cP with a Brookfield viscometer with a #5 spindle at 5 rpm and room temperature.

9. An aqueous dispersion comprising water and a powder composition, the powder composition comprising:
   (i) greater than about 50 weight percent starch;
   (ii) about 32-38 weight percent of an acrylic acid homopolymer, or an acrylic acid homopolymer salt;
   (iii) about 0.5 to 7 weight percent of a preservative;
   (iv) greater than about 1.5 weight percent of a compound comprising a combination of a vegetable oil and either a liquid olefin or a liquid paraffin ; and
   (v) about 1 to 10% clay;
   wherein the powder composition is compatible with water to form an aqueous dispersion and the dispersion, when applied to a surface, is capable of clinging to the surface, the dispersion having a substantially neutral pH of about 6.5 to 7.5 and is thixotropic.

10. The dispersion of claim 9 wherein the preservative is selected from the group consisting of citric acid, sorbic acid, potassium sorbate, mycobin, calcium propionate, methyl paraben and propyl paraben.

11. The dispersion of claim 9 wherein the compound comprises a combination of a vegetable oil and a liquid olefin.

12. The dispersion of claim 9 wherein the compound comprises about 0.5-3 weight percent of a vegetable oil.

13. The dispersion of claim 9 wherein the vegetable oil comprises a cottonseed oil or a soybean oil or mixtures thereof.

14. The dispersion of claim 9 comprising 4-6% clay.

15. The dispersion of claim 9 wherein the olefin comprises a synthetic liquid alpha olefin.

16. The dispersion of claim 9 comprising a viscosity of about 5,000-15,000 cP with a Brookfield viscometer with a #5 spindle at 5 rpm and room temperature.

\* \* \* \* \*